A. NYMAN.
POLYMORPHOUS DYNAMO ELECTRIC MACHINE.
APPLICATION FILED JUNE 19, 1918.

1,404,885.

Patented Jan. 31, 1922.
2 SHEETS—SHEET 1.

WITNESSES:
Ed. V. Herron
R. J. Fitzgerald

INVENTOR
Alexander Nyman
BY
Wesley G. Barr
ATTORNEY

A. NYMAN.
POLYMORPHOUS DYNAMO ELECTRIC MACHINE.
APPLICATION FILED JUNE 19, 1918.

1,404,885. Patented Jan. 31, 1922.
2 SHEETS—SHEET 2.

WITNESSES:
W. S. Reece
R. J. Fitzgerald

INVENTOR
Alexander Nyman
BY
Wesley S. Carr
ATTORNEY

UNITED STATES PATENT OFFICE.

ALEXANDER NYMAN, OF WILKINSBURG, PENNSYLVANIA, ASSIGNOR TO WESTINGHOUSE ELECTRIC & MANUFACTURING COMPANY, A CORPORATION OF PENNSYLVANIA.

POLYMORPHOUS DYNAMO-ELECTRIC MACHINE.

1,404,885.   Specification of Letters Patent.   Patented Jan. 31, 1922.

Application filed June 19, 1918. Serial No. 240,836.

*To all whom it may concern:*

Be it known that I, ALEXANDER NYMAN, a citizen of Finland, and a resident of Wilkinsburg, in the county of Allegheny and State of Pennsylvania, have invented a new and useful Improvement in Polymorphous Dynamo-Electric Machines, of which the following is a specification.

My invention relates to dynamo-electric machines for the production of high-frequency currents, as employed in wireless work, and it has for its object to provide apparatus of the character designated that shall be simple and compact in construction and effective in operation.

Figure 1:
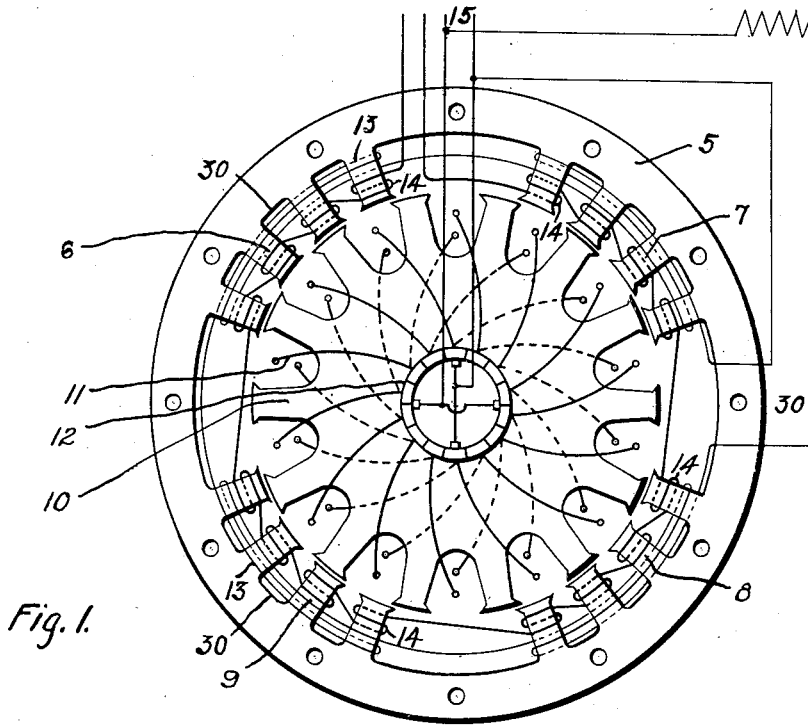
Figure 2:
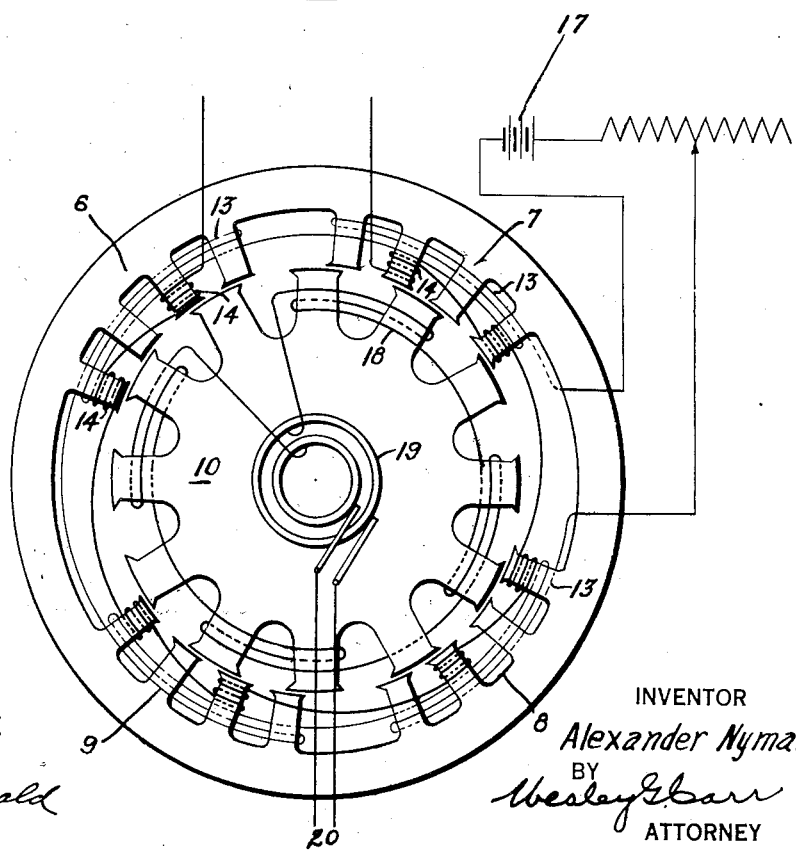
Figure 3:
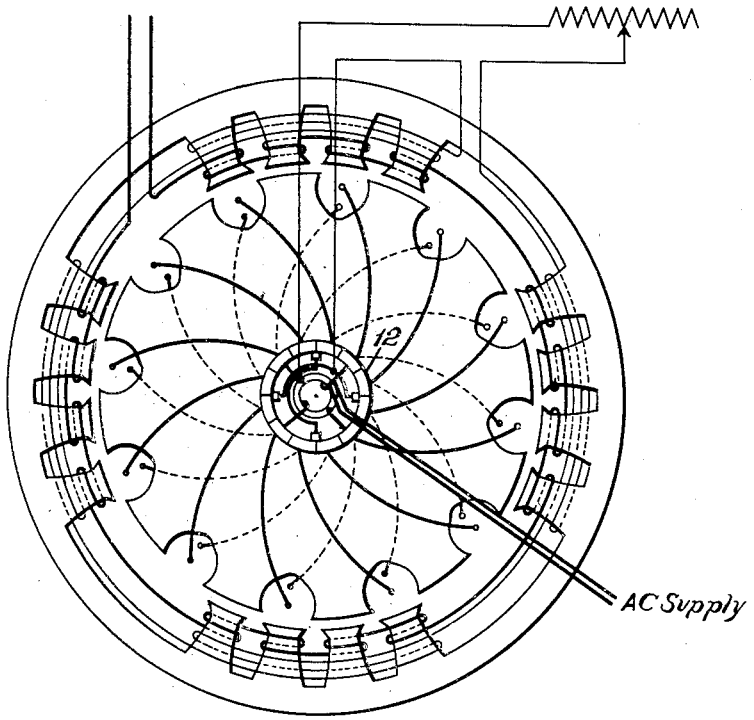

In the accompanying drawing, Fig. 1 is a side diagrammatic view of a dynamo-electric machine embodying a preferred form of my invention and Figs. 2 and 3 are similar views of modifications of the machine shown in Fig. 1.

In the generation of high-frequency, alternating currents for use in wireless telegraphy, telephony and similar fields of application, it is desirable that the apparatus be self-contained, that is, that no separate source of exciting currents be necessary. It is further desirable, as in airplane work, that the wireless generator shall also be adapted for supplying current for heating and lighting circuits, as well as for the wireless outfit.

With the above and other objects in view, I have found that, by providing the stator of a dynamo-electric machine with a plurality of groups of teeth and by employing said groups of teeth as individual poles to coact with a commutated member on a slotted rotor member, a unidirectional electromotive force may be generated for excitation of the machine itself and for the supply of such other load circuits as are adapted for the receipt thereof. Furthermore, by applying an auxiliary generating winding to the individual teeth of said stator member, in such manner that the electromotive forces produced therein by the flux pulsations in said teeth attendant upon the passage of the rotor teeth thereby shall be cumulatively combined, a high-frequency alternating electromotive force may be generated, as for wireless work.

In other words, the preferred form of my apparatus comprises a direct-current generator of the self-exciting type associated in an intimate structural manner with a high-frequency alternator of the inductor type.

In another form of my invention, I intimately associate a synchronous or a direct-current motor with an inductor alternator, employing a separate source of excitation and power supply, and, in a modification thereof, I combine a synchronous motor with an inductor alternator, the apparatus being self-exciting. Finally, I may, if desired, combine an induction motor with an inductor alternator, a separate source of excitation being employed. All of the aforementioned types of apparatus should, for best results, conform to the same general rules with respect to stator and rotor slot-pitch, tooth-width, etc., for the most effective operation.

Referring to Fig. 1 for a more detailed understanding of my invention, I show a stator member at 5, preferably laminated in structure, and with groups of inwardly projecting teeth 6, 7, 8 and 9 thereupon. The different groups of teeth may be separated by spaces such as would be formed by the omission of one or more teeth, that is to say, the pitch of the respective teeth may be an aliquot part of the inner circumference of the stator member or the pitch of the stator teeth, and the spaces intervening between tooth-groups may be incommensurable with the stator circumference. A rotor member 10 is mounted within the stator member 5 and is provided with equi-spaced teeth each of which has a width, at its crown, that is equal to, or is slightly different from, the pitch of the stator teeth.

A drum winding 11 is applied to the rotor member 10 and is connected to a commutator 12 of usual form. An exciting winding 13—13 is applied to the groups of stator teeth 6 to 9, inclusive, in such manner that a given group, as a whole, presents an exciting pole of one polarity to the rotor member, the groups of stator teeth on each side thereof being of the other polarity, in accordance with the usual exciting-pole practice in dynamo-electric machines.

An auxiliary generating winding 14—14 is also applied to the stator teeth, this winding being reversed in direction with each successive tooth and further so connected, as it passes from one group to another, that the electromotive forces generated therein shall be cumulatively combined.

Having thus described the structure of a machine embodying my invention, the generator operation is as follows: Upon driving the rotor 10 by any suitable means and energizing the winding 13, as by connection to the brushes of the commutator 12, the respective groups of stator teeth produce exciting poles, alternating in polarity, as above described. The winding 11 functions as the ordinary direct-current winding in supplying exciting current to the winding 13 and also, if desired, to a direct-current consumption circuit indicated at 15.

The location of a rotor tooth directly under a stator tooth renders the magnetic flux in said stator tooth a maximum, whereas, the location of a rotor tooth midway between two stator teeth renders the flux in said stator teeth a minimum. The flux pulsations thus produced in the stator teeth, by the passage of the rotor teeth thereunder, generate an alternating electromotive force of high frequency in the winding 14, as will be understood from a consideration of the well-known inductor alternator.

By providing an even number of teeth in the respective stator groups, the total exciting flux in any given stator tooth group is rendered substantially uniform, thus tending to assist in maintaining a uniform unidirectional output electromotive force.

It will be found, however, that if the rotor pitch is twice the stator pitch, that is, if the number of rotor teeth is one-half the number of teeth the stator would have if no teeth were omitted between the respective groups, a high-frequency ripple is superposed upon the unidirectional output with undesirable results, particularly with inductive circuits. By causing the rotor pitch to be slightly different from the stator pitch, as indicated in Fig. 1, wherein the stator tooth pitch is other than one-half the rotor tooth pitch, the above result is obviated and a uniform unidirectional electromotive force is produced by virtue of the fact that, when a rotor tooth is in perfect registry in one group, other rotor teeth are either approaching to, or receding from, perfect registry in the neighboring groups. The alternating electromotive forces produced in the successive portions of the winding 14 are thus rendered slightly out of phase with each other but this is not a serious difficulty as, by the addition of a few more turns thereto, the resultant electromotive force obtained by the composition of these out-of-phase electromotive forces is the same as though said component electromotive forces had been in phase, with the fewer number of turns.

In order to provide a suitable residual magnetization for rendering the machine self-exciting, it is desirable to attain saturation in the yoke member and, for this purpose, rivet holes may be placed therein to reduce the cross-section of iron, as indicated at 30–30.

If desired, the machine of Fig. 1 may be driven as a motor, thus acting as a converter for changing the energy of direct current into high-frequency alternating current. Direct current is supplied at the mains 15 and the armature 10 rotates as an ordinary direct-current armature.

Referring to the form of my invention shown in Fig. 2, the direct-current excitation for the exciting winding 13 is shown as derived from a separate source 17, and a rotor member 10 is shown as provided with a single-phase pole winding 18 connected to suitable slip rings 19 deriving alternating current from a supply circuit 20.

In operation, the machine of Fig. 2 is started in any suitable manner and then operates as a synchronous motor by the coaction between the poles determined by the winding 18 and the group poles of the stator member. The passage of the rotor teeth under the stator teeth provides an inductor-alternator action as in the previous case.

It will be noted that the pitch of the rotor teeth in Fig. 2 is twice that of the stator teeth and thus undesirable operation would be secured were it not for the fact that the stator tooth-groups 6 and 7 are moved toward each other by the tooth pitch, with respect to their position in Fig. 1 and, likewise, the stator tooth groups 8 and 9. Thus, when there is tooth registry in the tooth group 6, there is no perfect registry in the tooth group 7.

It will be noted that, with the arrangement thus disclosed, there would be a tendency to crowd the windings in the space between the groups 6 and 7 and between the groups 8 and 9, together with a tendency to waste space between the groups 6 and 9 and 7 and 8, respectively.

By applying the generating winding 14 only to those teeth immediately adjacent the wide inter-group spaces and to alternate teeth therefrom and by employing an even number of teeth in each of the stator groups, it will be noted that none but the exciting windings 13 occupy the narrow inter-group spaces. By this arrangement, a more compact and economical structure may be produced.

In the form of my invention shown in Fig. 3, alternating current is supplied to a rotor winding of the drum type for synchronous operation, as in the machine of Fig. 2, but the rotor member is further provided with a commutator 12 for the supply of unidirectional exciting current, the machine thus being in essence a rotary converter with a high-frequency generating winding applied to the stator teeth thereof.

In the machine of Fig. 3, the slip rings and alternating-current supply may be eliminated, if desired, and the armature be driven by an external source of power, serving to generate its own exciting current and also generating the desired high-frequency alternating currents.

In many cases, a source of polyphase alternating current is available and, with these conditions, it is preferable to employ an induction-motor drive rather than a synchronous-motor drive because of greater facility in starting.

It will be obvious that there are many other possible permutations and combinations of the different variable design features and it is, therefore, advisable at this time to give a brief resumé of the effect of modifying different features of the design, in order that the specific features of a machine for predetermined operating requirements may be ascertained.

In the case where the stator pitch is one-half the rotor pitch, there may be either an even or an odd number of stator teeth in each group and, with either of these cases, there may be an even or an odd number of rotor teeth per stator pole-pair. The use of an even number of stator teeth per group with an even number of rotor teeth per pole-pair or the use of an odd number per group with an odd number of rotor teeth per pole pair gives good spacing for the field coils in many cases. The use of an even number of stator teeth per group, with either an even or an odd number of rotor teeth per pole-pair, gives constant total flux and efficient working of the iron. The use of either an even or an odd number of teeth per stator group, with an odd number of teeth per pole-pair, gives a uniform direct-current voltage and insures positive starting as a motor.

By displacing the groups of stator teeth so that the intervening spaces are more or less incommensurable with the stator circumference, together with the use of an even number of rotor teeth per pole-pair, a more uniform direct-current voltage and an effective motor start is obtained. The use of this last-named arrangement is alternative to an even number of stator teeth per group, with an odd number of rotor teeth per pole-pair, and gives better spacing for the field coils in certain instances.

Turning now to machines wherein the stator pitch is different from half the rotor pitch, the use of an even number of stator teeth per group, with either an odd or an even number per pole-pair, is possible, giving good spacing for the field coils and a smooth wave form. An even number of stator teeth per group may be used with an even number of rotor teeth per pole-pair without preventing or impairing effective motor starting.

With reference to the configuration of the stator and rotor teeth, the stator slots should be closed as much as is permitted by reactance and design considerations. The use of a rotor tooth-crown equal to the stator pitch gives desirable starting conditions, when using an even number of stator teeth per group with an even number of rotor teeth per pole-pair, as there is no dead or locking point. The use of a rotor opening greater than the crown of the stator teeth permits the generation of higher voltage, because of the greater magnetic cycle traversed, but the use of an even number of stator teeth per group, with an even number of rotor teeth per pole-pair, leads to the danger of locking when starting.

While I have shown my invention in several of its forms, it will be obvious to those skilled in the art that it is not so limited but is susceptible of still other minor changes and modifications without departing from the spirit thereof and I desire, therefore, that only such limitations shall be placed thereupon as are imposed by the prior art or as are specifically set forth in the appended claims.

I claim as my invention:

1. In a generator, the combination with a laminated stator member provided with a plurality of groups of spaced teeth, of exciting windings individually embracing pluralities of said teeth, a slotted rotor member provided with a commutated winding, the width of the rotor teeth being such that when a rotor tooth is in registry with one stator group, the other rotor teeth are either approaching to, or receding from, registry in the neighboring groups, means for energizing said exciting winding from said commutated winding, and an additional stator winding embracing individual teeth of said stator in such manner that the electromotive forces generated therein by the flux pulsations in said teeth, upon the passage of rotor teeth thereby, are cumulatively combined.

2. In a generator, the combination with a laminated stator member provided with a plurality of groups of spaced teeth, of exciting windings individually embracing pluralities of said teeth, a slotted rotor member provided with a commutated winding, the width of the rotor teeth differing slightly from the pitch of the stator teeth, means for energizing said exciting winding from said commutated winding, and an additional stator winding embracing individual teeth of said stator in such manner that the electromotive forces generated therein by the flux pulsations in said teeth, upon the passage of rotor teeth thereby, although slightly out of phase, are cumulatively combined.

3. In a generator, the combination with a laminated stator member provided with a plurality of groups of spaced teeth, of exciting windings embracing said groups of teeth, a slotted rotor member provided with teeth to which is applied a commutated winding, the number of rotor teeth differing slightly from one-half the number of teeth the stator would have if no teeth were omitted between the groups, means for energizing said exciting winding from said commutated winding, and an additional stator winding embracing individual teeth of said stator in such manner that the electromotive forces generated therein by the flux pulsations in said teeth, upon the passage of the rotor teeth thereby, are cumulatively combined.

4. In a generator, the combination with a laminated stator member provided with a plurality of groups of spaced teeth, there being an even number of teeth in each group, of exciting windings embracing said groups of teeth, a slotted rotor member provided with teeth to which is applied a commutated winding, means for energizing said exciting winding from said commutated winding, and an additional stator winding embracing individual teeth of said stator in such manner that the electromotive forces generated therein by the flux pulsations in said teeth, upon the passage of the rotor teeth thereby, are cumulatively combined, the teeth being so arranged that the electromotive forces produced in the successive portions of said additional stator winding are slightly out of phase.

5. In a generator, a laminated stator member provided with a plurality of groups of spaced teeth, portions of said stator member having reduced cross section, an exciting winding embracing said stator teeth, a rotor member provided with a commutated winding, equi-spaced teeth on said rotor member, each of which has a width, at its crown, that is slightly different from the pitch of the stator teeth, means for energizing the exciting winding from the commutated winding, and an additional winding embracing the individual stator teeth and in which, by reason of the relative dimensions of said stator teeth and said rotor teeth, electromotive forces are generated which are slightly out-of-phase.

6. In a generator, a laminated stator member provided with a plurality of groups of spaced teeth and having rivet holes therein at appropriate points for reducing the cross-section of said stator member, an exciting winding embracing said stator teeth, a rotor member provided with a commutated winding, equi-spaced teeth on said rotor member, each of which has a width, at its crown, that is slightly different from the pitch of the stator teeth, means for energizing the exciting winding from the commutated winding, and an additional winding embracing the individual stator teeth and in which, by reason of the relative dimensions of said stator teeth and said rotor teeth, electromotive forces are generated which are slightly out-of-phase.

In testimony whereof, I have hereunto subscribed my name this 1st day of June, 1918.

ALEXANDER NYMAN.